US006867255B2

(12) United States Patent
Robello et al.

(10) Patent No.: US 6,867,255 B2
(45) Date of Patent: Mar. 15, 2005

(54) EXFOLIATED POLYSTYRENE-CLAY NANOCOMPOSITE COMPRISING STAR-SHAPED POLYMER

(75) Inventors: Douglas R. Robello, Webster, NY (US); Nori Yamaguchi, Bear, DE (US); Thomas N. Blanton, Rochester, NY (US); Craig L. Barnes, Leroy, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/678,874

(22) Filed: Oct. 3, 2003

(65) Prior Publication Data

US 2004/0068038 A1 Apr. 8, 2004

Related U.S. Application Data

(62) Division of application No. 10/155,256, filed on May 24, 2002, now Pat. No. 6,686,407.

(51) Int. Cl.$^7$ ............................................. C08L 25/08
(52) U.S. Cl. ....................... 524/577; 524/442; 524/445; 524/447; 525/241; 525/219
(58) Field of Search ................... 524/577, 445, 524/447, 442; 525/241, 219

(56) References Cited

U.S. PATENT DOCUMENTS 6,451,897 B1 * 9/2002 Niyogi ....................... 524/445

FOREIGN PATENT DOCUMENTS

| WO | 99/07790 | 2/1999 |
| WO | 03/016392 | 2/2003 |

OTHER PUBLICATIONS

Balazs et al. Polym. Int., 2000, 49, 469–471.*
Richard A. Vaia et al; "Synthesis And Properties Of Tow–Dimensional Nanostructures By Direct Intercalation Of Polymer Melts In Layered Silicates"; Chemistry Of Materials; American, American Chemical Society, Washington, US; vol. 120; No. 2; 1993; pp. 1694–1696.
Chandralekha Singh & Anna C. Balazs*, Effect of polymer architecture on the miscibility of polymer clay mixtures, Acc. Chem. Res. 1999, 32, 651; Polymer International 49:469–471 (2000).

* cited by examiner

Primary Examiner—David W. Wu
Assistant Examiner—Rip A Lee
(74) Attorney, Agent, or Firm—Chris P. Konkol

(57) ABSTRACT

A nanocomposite made with an inorganic layered material and a star-shaped polystyrene that can be blended with normal linear polystyrene is disclosed. The inorganic layered material can have an exfoliated structure, substantially exfoliated, or intercalated structure. The exfoliated structure can result in significantly improved physical properties, even with only a very low content of clay. The invention is also directed to a process that can be used to make the compositions of the present invention. In one embodiment, a physical mixture of clay and star polymer is prepared and then the mixture is heated for several hours, preferably under high-shear mixing, to increase the rate of exfoliation, after which mostly inexpensive commodity linear polystyrene polymer completes the composition.

10 Claims, 6 Drawing Sheets

EXFOLIATED POLYSTYRENE-CLAY NANOCOMPOSITE COMPRISING STAR-SHAPED POLYMER

CROSS-REFERENCE TO RELATED APPLICATIONS

This is a divisional of application Ser. No. 10/155,256, filed May 24, 2002, now U.S. Pat. No. 6,686,407 in the names of Douglas R. Robello, et al., entitled EXFOLIATED POLYSTYRENE-CLAY NANOCOMPOSITE COMPRISING STAR-SHAPED POLYMER.

FIELD OF THE INVENTION

The invention relates to the formation of an exfoliated or intercalated polymer-clay nanocomposite composition comprising a star-shaped polymer, and methods of forming such a composition.

BACKGROUND OF THE INVENTION

There have been extensive efforts directed towards the preparation of various polymer-clay composite materials since the discovery of exfoliated nylon/clay nanocomposites by Usuki et al. (*J. Mater. Res.* 1993, 8, 1174). Such materials are expected to have new and improved properties compared to those of the polymers alone. Such improved properties include mechanical, thermal, and barrier properties. For example, see M. Alexandre and P. Dubois *Mater. Sci. Eng.* 2000, 28, 1; and T. J. Pinnavaia and G. W. Beall *Polymer-Clay Nanocomposites*, John Wiley & Sons, Ltd. New York, 2000, pp. 195–226.

Incorporation of a few percent of clay has been found to greatly increase a polymer's modulus, strength, gas barrier properties, and heat distortion temperature. The presence of clay is also reported to impart fire retardant properties. Without wishing to be bound by theory, the improvement in thermal stability is believed to be attributed to tortuous diffuision of the volatile thermal and thermo-oxidative decomposition products in the presence of dispersed silicate layers. The slower diffusion of decomposed volatiles along with structural reinforcement provided by the char formed with collapsing silicate layers during combustion contributes to decreased flammability of exfoliated nanocomposite as demonstrated by cone calorimetry. See for example, J. Zhu and C. A. Wilkie *Polym. Int.* 2000, 49, 1158; and J. W. Gilman *Appl. Clay Sci.* 1999, 15, 31.

The most common morphology for miscible polymer-clay dispersions is known as intercalation. In this case, the host polymer penetrates the space between the clay platelets, but separating them only slightly and maintaining the parallel, regular structure of the platelets. Intercalated polymer-clay nanocomposites are often observed to have measurable improvements in physical properties, but typically less so than if the corresponding nanocomposite were in the morphology known as exfoliation. Although exfoliation is much more desirable, it is less common and more difficult to obtain. In this morphology, the clay platelets are thoroughly separated from each other by the host polymer, so that their original crystallographic register is lost. Particularly for nonpolar polymer hosts, the fully exfoliated polymer-clay nanocomposites are notoriously difficult to obtain.

Non-polar polymers, including polystyrene and polyethylene, represent a group of commercially important thermoplastics. For example, more than five billion pounds of polystyrene are produced annually in the US and injection molded or extruded into specific products. Polystyrene and linear low density polyethylene (LLDPE) homopolymers form intercalate morphologies when melt blended with organically modified clays known as organoclays. See, for example, R. A. Vaia and E. P. Giannelis *Macromolecules* 1997, 30, 8000; and also K. H. Wang et al. *Polymer,* 2001, 42, 9819.

Although exfoliation of clay in these non-polar polymers is more desirable, achieving this state of morphology is particularly challenging because the polymers are not strongly attracted to the clay surfaces. One approach to achieve this goal is in-situ polymerization of non-polar monomers in the presence of organoclay bearing either polymerizable functional groups or initiators. See, for example, X. Fu and S. Qutubuddin *Polymer* 2001, 42, 807; J. Zhu et al, *Chem. Mater.* 2001, 13, 3774; and M. W. Weimer et al. *J. Am. Chem. Soc.* 1999, 121, 1615.

Another method to achieve exfoliation of such non-polar polymers is to incorporate polar units in the backbone of non-polar guest polymers and subsequently melt blend them with a host organoclay. See, for example, N. Hasegawa et al. *J. Appl. Polym. Sci.* 1999, 74, 3359; and C. I. Park et al. *Polymer* 2001, 42, 7465. The latter strategy is industrially more feasible, but increasing the fraction of polar units in non-polar polymers may result in undesirable morphological changes, e.g., phase separation. Thus, complete exfoliation of organoclay in non-polar homopolymer has not been commercially or economically practicable on a comparable scale.

The phase behavior of polymer/clay composites has been the subject of recent computational studies. See A. C. Balazs et al. *Acc. Chem. Res.* 1999, 32, 651; and C. Singh and A. C. Balazs, *Polym. Int.* 2000, 49, 469. The thermodynamic models of Balazs and Singh theoretically predict a better intercalation and, in some cases, when the interactions between the organic modifiers and the polymer chains is enhanced, exfoliation of the organoclay in pure star-shaped polymers.

PROBLEM TO BE SOLVED BY THE INVENTION

There is a need for an exfoliated polymer-clay nanocomposite composition comprising clay and polystyrene (a very non-polar polymer) which composition can be produced in large scale volume by a commercially practical method.

SUMMARY OF THE INVENTION

Applicants have discovered that an exfoliated or intercalated nanocomposite of clay with polystyrene, including polymer blends therewith, can be prepared by first compounding a special polymer comprising polystyrene with the clay. Compounding in this case means simply heating a physical mixture of the special polymer and clay above the glass transition temperature of the special polymer. The special polymer has a star architecture and is referred to as a "star polymer." A star polymer is made of several (at least three) branches radiating from a central core. In contrast, normal linear polystyrene does not form an exfoliated nanocomposite with clay, even after prolonged heating. A nanocomposite made with star-shaped polystyrene can be blended with normal linear polystyrene, yet still maintain an exfoliated morphology.

The present invention covers clay-polymer nanocomposites in either exfoliated form or, for use in making exfoliated nanocomposites upon further processing, the clay-polymer nanocomposites in intercalated form. The nanocomposites can be blended with other polymers or additional amounts of polymer to obtain a desired composition. A mixture of clay, star polymer, and linear polystyrene, whether in intercalated or exfoliated form, will be referred to herein as a "three-part" mixture, and a mixture of clay and star polymer, but without linear polystyrene, whether in intercalated or exfoliated form, will be referred to as a "two-part mixture," although additional components may be present in a mixture. Either a two-part mixture or a three-part mixture may be formed initially, and higher amounts of linear polystyrene added to achieve the desired composition. Once exfoliation of the mixture is achieved, the exfoliated structure can be maintained even in the presence of additional or higher amounts of linear polystyrene.

The present invention can be used to provide an exfoliated polystyrene-clay material with greatly improved physical properties in several respects, compared to the polymer, even with a very low content of clay. For example, the modulus, fracture toughness, gas barrier properties, and heat distortion temperature of such materials can be increased significantly. In addition, improved fire retardant properties can be imparted to the nanocomposite by the presence of the clay in the polymer.

The invention is also directed to a process that can be used to make compositions of the present invention. In one embodiment, a physical mixture comprising powdered clay and star polymer is prepared, and then the mixture is heated for a sufficient period of time, preferably under high-shear mixing, to increase the rate of exfoliation.

As indicated above, only a small amount of clay (1–10% by weight) is necessary to significantly improve the physical properties of the polystyrene-containing composition. Similarly, only a relatively small amount of the star polymer is required. In a preferred embodiment, therefore, a final nanocomposite can be made comprised largely of relatively inexpensive commodity linear polystyrene polymer.

DETAILED DESCRIPTION OF THE INVENTION

Figure 1:
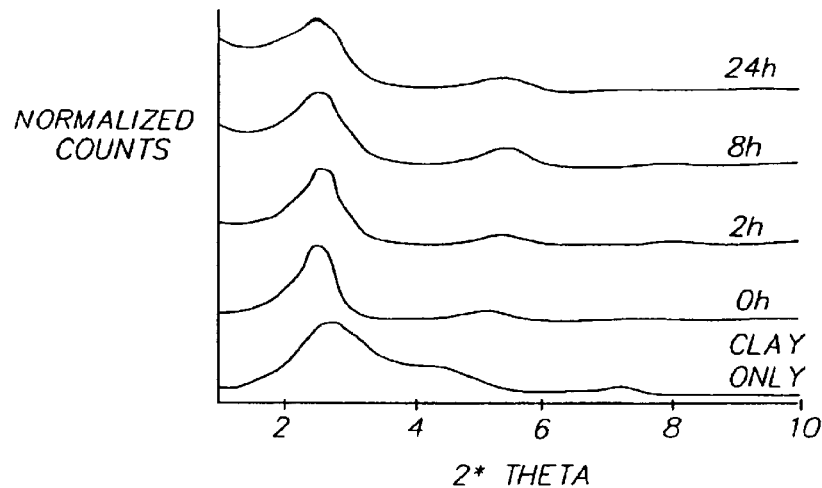
FIG. 1 shows X-ray diffraction patterns of a linear polystyrene clay mixture of Example 14 below annealed for various periods of time at 185° C.

As indicated above, the present invention involves an intercalated or exfoliated nanocomposite comprising a multilayered material such as clay with a polystyrene-containing star polymer. In some cases, this nanocomposite is an intermediate for a referred composition comprising an exfoliated nanocomposite predominantly comprising, in addition to clay and the star polymer, normal or general-purpose linear polystyrene, most preferably a commodity form thereof.

Whenever used in the specification the terms set forth shall herein have the following meaning:

"Nanocomposite" shall mean a composite material wherein at least one component comprises an inorganic phase, such as a smectite clay, with at least one dimension in the 0.1 to 100 nanometer range.

"Plates" shall mean particles with two comparable dimensions significantly greater than the third dimension, e.g., length and width of the particle being of comparable size but orders of magnitude greater than the thickness of the particle.

"Layered material" shall mean an inorganic material such as a smectite clay that is in the form of a plurality of adjacent bound layers.

"Platelets" shall mean individual layers of the layered material.

"Intercalation" shall mean the insertion of one or more foreign molecules or parts of foreign molecules between platelets of the layered material, usually detected by X-ray diffraction technique, as illustrated in U.S. Pat. No. 5,891, 611 (line 10, col.5–line 23, col. 7).

"Intercalant" shall mean the aforesaid foreign molecule inserted between platelets of the aforesaid layered material.

"Exfoliation" or "delamination" shall mean separation of individual platelets in to a disordered structure without any stacking order. By the term "substantially exfoliated" is meant that at least 80 percent of the original background-subtracted X-ray diffraction peak intensity (height) due to the (001) basal plane has been lost, as shown by a standard measurement in conformity with the type of measurements provided in Examples below. The term "(001) basal plane" shall refer to the spacing between a layer of silicate atoms in one plane to the corresponding layer of silicate atoms in another plane, including any material present between layers. This can also be referred to as basal plane spacing or d(001).

"Intercalated" shall refer to layered material that has at least partially undergone intercalation. This can also include material that has undergone both partial intercalation and partial exfoliation.

"Organoclay" shall mean clay material modified by organic molecules.

"Swellable" shall refer to a layered material capable of showing an increase or expansion in spacing between layers resulting from insertion of species into the said layered material.

Clays in a polymer-clay nanocomposites of the present invention can be ideally thought to exist in one of three structures: (1) clay tactoids wherein the clay particles are in face-to-face aggregation with no organics inserted within the clay lattice; (2) intercalated clay wherein the clay lattice has been expanded to a thermodynamically defined equilibrium spacing due to the insertion of individual polymer chains, yet maintaining a long range order in the lattice; and (3) exfoliated clay wherein singular clay platelets are randomly suspended in the polymer, resulting from extensive penetration of the polymer into the clay lattice and its subsequent delamination. As indicated above, the greatest property enhancements of polymer-clay nanocomposites are expected with the structure (3) mentioned above.

The clay material suitable for use in this invention can comprise any inorganic phase comprising layered materials in plates or other shapes with a significantly high aspect ratio. The clay materials suitable for this invention include phyllosilicates, e.g., montmorillonite, particularly sodium montmorillonite, magnesium montruorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be intercalated with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4-_2H_2O$, $CaPO_4CH_3-H_2O$, $MnHAsO_4-H_2O$, $Ag_6Mo_{10}O_{33}$ and the like. Preferred clays are swellable. These swellable clays include phyllosilicates of the 2:1 type, as defined in clay literature (vide, for example, H. van Olphen *An Introduction to Clay Colloid Chemistry,* John Wiley & Sons Publishers, 1977, hereby incorporated by reference). Typical phyllosilicates with ion exchange capacity of 50 to 300 milliequivalents per 100 grams are preferred. Preferred clays for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. The most preferred clays include montmorillonite, hectorite and hydrotalcites, because of their effectiveness in the present invention and/or the commercial availability of these materials.

The aforementioned clays can be natural or synthetic, for example synthetic smectite clay. This distinction can influence the particle size and/or the level of associated impurities. Typically, synthetic clays are relatively smaller than natural clays in lateral dimension, and therefore possess smaller aspect ratio. However, synthetic clays are purer and are of narrower size distribution, compared to natural clays, and may not require any further purification or separation. For this invention, the clay particles should have (on average) a lateral dimension of between 0.01 μm and 5 μm, and preferably between 0.05 μm and 2 μm, and more preferably between 0.1 μm and 1 μm. The thickness or the vertical dimension of the clay particles can vary (on average) between 0.5 nm and 10 nm, and preferably between 1 nm and 5 nm. The aspect ratio, which is the ratio of the largest and smallest dimension of the clay particles should be >10:1 and preferably >100:1 and more preferably >1000:1 for use in compositions of this invention. The aforementioned limits regarding the size and shape of the particles are designed to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers.

The clay used in this invention can be an organoclay. Organoclays are produced by interacting the unfunctionalized clay with suitable intercalants. These intercalants are typically organic compounds, which are neutral or ionic. Useful neutral organic molecules include polar molecules such as amides, esters, lactams, nitriles, ureas, carbonates, phosphates, phosphonates, sulfates, sulfonates, nitro compounds, and the like. The neutral organic intercalants can be monomeric, oligomeric or polymeric. Neutral organic molecules can cause intercalation in the layers of the clay through hydrogen bonding, without completely replacing the original charge balancing ions. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays are available from clay vendors, which may be used in the practice of this invention.

The tailoring the organic modifiers of the clay can facilitate a better interaction with incoming polymer chains, to further promote the clay exfoliation achieved by the star polymers of the present invention. Such an improvement has been theorized by C. Singh and A. C. Balazs (*Polym. Int.* 2000, 49, 469). For example, an organoclay with benzylammonium cations as the organic modifiers, can provide possibly a stronger affinity to polystyrene chains as compared to simple aliphatic alkylammonium cations. Without wishing to be bound by theory, this may be due to aromatic-aromatic type interactions, e.g., π-π stacking and edge-to-face interaction, in addition to the contribution from Van der Waals interaction.

An important component of the nanocomposite composition of the present invention, in addition to the above mentioned clay, is a star polymer. As the term is used herein, the minimum or common requirements of a "star polymer" is that this type of polymer has a star architecture, that is, it comprises several (at least three) polymeric branches or arms radiating from a central core. The providing of a star architecture can involve attaching or anchoring polymer "arms" to the "core." Preferably, however, the arms are polymerized by chain growth of monomer onto the core. To ensure that the arms are not desorbed or displaced, the arms are preferably covalently linked to the core.

The arms attached to the core can also be referred to as "chains," "polymeric chains," or the like. The arms of the star polymer comprise polystyrene. Preferably more than 50 percent, more preferably more than 80 percent, most preferably more than 90 percent by weight of the arms comprise polymerized styrene monomers. Lesser amounts of other ethylenically unsaturated monomers may be included. In the case of preformed macromonomer arms, functional monomers or end groups may be used for anchoring the arms to the core.

The polymer architecture and the polymer repeat units in the arms of the star polymer can be varied. For example, the number of arms can be varied. Preferably, the star polymers comprise on average 3 to 20, preferably 3 to 12 arms, more preferably 5 or 6 arms.

The star polymer suitably has a weight average molecular weight of at least about 10,000, preferably greater than 20,000, most preferably greater than 50,000 up to 1,000,000. The arms each on average suitably have a molecular weight of about 1,000 to 100,000, preferably 2,000 to 50,000, most preferably 5,000 to 20,000 and preferably comprise 50 to 100% by weight, based on the weight of the arm, of polymerized styrene monomers.

Preferably the core of the star polymer comprises less than 10 percent (more preferably less than 5 percent), by weight of the star polymer, and preferably with the balance comprising the arms. More preferably, the arms comprise 90 to 99% by weight of the star polymer. The core preferably has a weight average molecular weight of less than 5,000, more preferably less than 3,000.

Star polymers can be made by various processes. For example, J. P. Kennedy and S. Jacob (*Acc. Chem. Res.* 1998, 31, 835, hereby incorporated by reference) describe three general schemes for star polymer synthesis: core-first (arm-growing), arm-first (arm-linking), and nodule methods.

The core-first (arm-growing) method: In the core-first (arm-growing) method, a preferred embodiment, star polymers are synthesized by polymerization of conventional monomers using a polyfunctional initiator, that is, a core molecule with a plurality of functional groups, each capable of initiating a chain polymerization. The chains then grow outward from the core molecule. When living polymerization reactions are employed, the number and length of the arms on the resulting star polymer can be predicted and controlled.

Various forms of conventional living polymerization have been employed to synthesize star polymers by the core-first (arm-growing) method. For example, B. Gordon et al. (*Polym. Bull.* (*Berlin*) 1984, 11, 349) prepared three-arm polystyrene using the cycloheptatrienyl trianion as initiator. Similarly, S. Jacob et al. (*Macromolecules* 1996, 29, 8631) prepared eight-arm star polyisobutylene by polymerization from an octafunctional calixarene initiator. Group transfer polymerization of acrylic monomers using polyfunctional initiators was disclosed by W. B. Farnham and D. Y. Sogah (U.S. Pat. No. 4,524,196, 1983) to produce star polymers with three or four arms. In recent years, living radical polymerization has proved to be an especially convenient means for synthesizing star polymers. For example, V. Percec et al (*J. Polym. Sci., Part A: Polym. Chem.* 2000, 38, 4776) described the synthesis of three-, four-, six-, and eight-arm star polymers from the appropriate multifunctional initiators. In the same way, S. Angot et al. (*Macromolecules* 2000, 33, 7261) prepared four-, six-, and eight-arm star polystyrene and poly(methyl methacrylate). Further examples of star polymer synthesis using living radical polymerization are given by A. Heise et al. (*Macromolecules* 2001, 34, 3798); C. Burguière et al. (*Macromolecules* 2001, 34, 4439); and A. Kraus and D. R. Robello (*Polym. Prepr.* (*Am. Chem. Soc., Div. Polym. Chem.* 1999, 40(2), 413).

In addition, examples of the core-first (arm-growing) method using monomers other than vinyl compounds have been reported. For example, J. L. Hedrick et al. (*Macromolecules* 1998, 31, 8691) disclosed the synthesis of six-arm polycaprolactone by ring opening polymerization using a hexafunctional initiator.

The arm-first (arm-linking) method: In the arm-first (arm-linking) method, linear chains are first prepared with a unique functional group at one terminus. This functional group comprises the reactive terminus of a living chain polymerization, in a common embodiment. Several chains are subsequently linked to a polyfunctional core molecule to produce the final star macromolecule. Again, when living polymerization techniques are employed, the number and length of the arms on the resulting star polymer can be predicted and controlled. However, the arm-first (arm-linking) method can suffer from problems due to steric congestion at the core, leading to star molecules with fewer than the desired number of arms.

As with the core-first (arm-growing) method, various forms of conventional living polymerization have been employed to synthesize star polymers by the arm-first (arm-linking) method. For example, N. Hadjichristidis et al. (*Macromolecules* 1978, 11, 668) synthesized eight- and twelve-arm star polymers by anionic polymerization of isoprene followed by coupling reactions with octa- and dodecafunctional chlorosilanes. Similarly, I. Majoros et al. (*Polym. Bull.* (*Berlin*) 1997, 38, 15) demonstrated that an eight-arm star polymer of isobutylene could be prepared by cationic polymerization followed by coupling onto an octafunctional cyclic siloxane core.

The nodule method: In the nodule method, arms are first grown by a living polymerization technique using conventional monomers, and then the arms are exposed to a second monomer with two or more polymerizable moieties. The ensuing polymerization reactions form a microgel core with a plurality of pendant arms. The arms present a steric buffer against core-core reactions, and inhibit the formation of cross-linked material that would ordinarily be produced by polymerization of polyfunctional monomers. In a related embodiment, it is possible in certain cases to form the microgel core first, and grow the arms subsequently.

An early example of the nodule method for synthesizing star polymers was described by J. G. Zilliox et al. (*J. Polym. Sci. C* 1968, 22, 145). In this instance, living anionic polymerization of styrene followed by reaction with divinylbenzene (nodule-forming monomer) produced multiarm star polymers. In another example, J. P. Kennedy et al. (U.S. Pat. No. 5,395,885, 1985) reacted living cationic polyisobutylene with divinylbenzene to produce a star polymer with 56 arms, on average. Living radical polymerization has also been employed in an analogous manner. For example, J. Xia et al. (*Macromolecules* 1999, 32, 4482) used atom transfer radical polymerization to link polystyrene chains to a core derived from secondary polymerization of various divinyl monomers. Examples of multiarm star polymers made via the nodule method and with initial formation of the microgel core followed by chain growth were disclosed by H. Hallensleben et al. (*Makromol. Chem.* 1973, 173, 235) and H. J. Spinelli (U.S. Pat. No. 4,810,756, 1989).

The residual end group from living polymerization reactions, for example, a halide from atom transfer radical polymerization and be removed by a post-polymerization reaction in an optional procedure. See, for example, V. Coessens and K. Matyjaszewski (*Macromol. Rapid Commun.* 1999, 20, 66); and C. D. Borman et al. (*Polymer* 2000, 41, 6015).

In preferred embodiments, especially for a final composition for use in a final product (compared to an intermediate composition to be modified prior to fabrication into a final product), a further component of the nanocomposites of the present invention is normal linear polystyrene. Polystyrene is a well-known thermoplastic, melt processable polymer. It is clear, transparent and easily colored It softens near 100° C. The commercial product is atactic and therefore amorphous. As made, polystyrene is outstandingly easy to process or fabricate. Its stability and flow under injection molding make it an ideal polymer for this technique as well as other techniques. Because there is no crystalline melting point, the transition from glass to liquid is gradual and fabrication requires relatively little energy. Above the glass-transition temperature, polystyrene is a viscoelastic liquid with high melt strength that can be easily fabricated by extrusion or injection molding techniques. A normal linear polystyrene resin has a weight average molecular weight of about 1,000 to 1,000,0000, preferably 50,000 to 500,000. The polystyrene resin contains from about 95 to about 100 percent monomeric styrene.

There are three common commercial grades of general-purpose polystyrene: easy flow, medium flow, and high heat. The choice of resin grade depends mostly on the fabrication method, but also on the end-use application. Easy flow and medium flow polystyrenes are used primarily for injection molding; high heat polystyrene is used mostly for extrusion applications. Most commercial polystyrene producers have resins in each of these grades. Beside the common grades of general-purpose polystyrene, there are several specialty grades that have some unique properties, for example fast-cycle resins, food-contact-grade resins, and low molecular weight resins.

Most polystyrene is made by suspension polymerization or polymerization in bulk, although solution or emulsion polymerization can also be used. See "Styrene Polymers," in *Encyclopedia of Polymer Science and Engineering,* Vol. 16 (2$^{nd}$ edition John Wiley & Sons), pp 1–250, hereby incorporated by reference. The terms "normal linear polystyrene," "commercial linear polystyrene," and "commodity polystyrene" or the like are herein used interchangeably and are meant to include common general-purpose commercial grades and specialty grades.

Polymer blends include blends of polystyrene with lesser amounts of other polymers, for example with poly (phenylene ether) or PPE, commonly called poly(phenylene oxide) or PPO® polymer. Blends of polystyrene and PPO are commercially available from General Electric Co. (Schenectady, N.Y.) under the trade name Noryl®. There is a growing roster of commercially significant blends of polystyrene that can be used in the invention.

Compositions according to the present invention suitably comprise from about 1 to 99 percent by weight, based on the total weight of the nanocomposite, of star polymer, and from about 0.5 to 50 percent by weight, preferably 1 to 25 percent by weight, more preferably 1 to 19 weight percent, based on the weight of the total nanocomposite, of exfoliated or intercalated multilayered inorganic material, with the balance (if any) of linear polystyrene or blends thereof, preferably greater than 50 weight percent linear polystyrene.

In a preferred embodiment, a final composition comprises from about 68 to 98 percent by weight, preferably 80 to 96 percent by weight, based on the total weight of the nanocomposite, of normal linear polystyrene resin, from about 1 to 30 percent, preferably 2 to 25 percent, based on the total weight of the nanocomposite, of star polymer, and from about 1 to 10 percent by weight, preferably 2 to 10 percent, based on the weight of the total nanocomposite, of exfoliated or intercalated multilayered inorganic material. Other polymers such as PPO® polymer can be blended with the polystyrene in amounts up to 45 weight percent of the total nanocomposite, preferably 1 to 25 weight percent.

Another aspect of the invention is a process that can be used to make the compositions of the present invention. In one embodiment, a physical mixture of powdered clay and star polymer, or star polymer and linear polystyrene, is prepared and then the mixture is heated for several hours, preferably under high-shear mixing to increase the rate of exfoliation. Additional amounts of polymer, linear polystyrene or blends therewith, can be added in later stages or in subsequent processing.

In one embodiment of the invention, the process comprises forming a flowable mixture comprising a star polymer, or a star polymer and a polystyrene polymer, in a "polymer melt" and at least one "swellable and polymer-compatible intercalated layered material." As used herein, a "flowable mixture" is a mixture which is capable of flowing at the submicron scale so that the layered materials may exfoliate into platelet particles comprising individual or a small multiple of layers, which may in turn disperse within the polymer mixture. As used herein, a "polymer melt" is a melt processable polymer or mixture of polymers which has been heated to a temperature sufficiently high to produce a viscosity low enough for submicron scale mixing to occur. Temperatures used in the first step are not critical and can be varied as desired provided that the polymer employed is in the state of a polymer melt. In the preferred embodiments of the invention, process temperature should be above the transition temperature of the polymer material employed and below the degradation temperature of the polymer or other components of the mixture, such as surfactant on an organoclay. Suitably, the melt is heated to a temperature of 120 to 225° C.

The manner in which the flowable mixture is formed is not critical and any conventional methods can be employed. For example, the flowable mixture can be prepared through use of conventional polymer and additive blending means, in which the polymer material is heated to a temperature sufficient to form a polymer melt and combined with the desired amount of the intercalated layered material in a granulated or powdered form in a suitable mixer, as for example an extruder, a Banbury® mixer, a Brabender® mixer, a continuous mixer or the like. The term "mix" or "mixing" does not necessary mean that a conventional mixer is used, since extruders or other devices that, although not usually considered "mixers" in the common vernacular, can easily achieve a mixture when used for mixing.

The heating during the formation of a flowable mixture alone can provide exfoliation. However, as an optional further step, the flowable mixture can be subjected to a shear sufficient to form the dispersed exfoliated nanocomposite structure of platelet particles in the polymer melt, and it is thereafter cooled. The flowable mixture can be subjected to a shear having an "effective shear rate." As used herein, an "effective shear rate" is a shear rate (as defined in F. Rodriguez, *Principles of Polymers Systems*, McGraw-Hill Book Company, New York, 1982) which is effective to delaminate at least about 90% by weight of the intercalated material to form platelet particles described above, and provide a composition comprising a polymeric matrix having platelet particles substantially homogeneously dispersed therein. In the preferred embodiments of the invention, the shear rate is greater than about 10 sec$^{-1}$. In these preferred embodiments of the invention, the upper limit for the shear rate is not critical provided that the shear rate is not so high as to physically degrade the polymer. In the particularly preferred embodiments of the invention, the shear rate is preferably from greater than about 10 sec$^{-1}$ to about 2000 sec$^{-1}$, and in the most preferred embodiments of the invention the shear rate is from about 50 sec$^{-1}$ to about 500 sec$^{-1}$.

Any method which can be used to apply a shear to a flowable mixture or any polymer melt can be used. The shearing action can be provided by any appropriate method, as for example by mechanical means, by thermal shock, by pressure alteration, or by ultrasonics. Methods useful in shearing melts are known in the art, and will not be described in great detail. In particularly useful procedures, the flowable polymer mixture is sheared by mechanical methods in which portions of the melt are caused to flow past other portions of the mixture by use of mechanical means such as stirrers, Banbury® type mixers, Brabender® type mixers, long continuous mixers, and extruders. Another procedure employs thermal shock in which shearing is achieved by alternatively raising or lowering the temperature of the mixture causing thermal expansions and resulting in internal stresses which cause the shear. In still other procedures, shear is achieved by sudden pressure changes in pressure alteration methods; by ultrasonic techniques in which cavitation or resonant vibrations which cause portions of the mixture to vibrate or to be excited at different phases and thus subjected to shear.

These methods of shearing flowable polymer mixtures and polymer melts are merely representative of useful methods, and any method known in the art for shearing flowable polymer mixtures and polymer melts may be used.

In the preferred embodiments of the invention, mechanical shearing methods are employed such as by extrusion, injection molding machines, mixers, and the like. In the more preferred embodiments of the invention, shearing is achieved by introducing the polymer melt at one end of the extruder (single or double screw) and receiving the sheared polymer at the other end of the extruder. The temperature of the polymer melt, the length of the extruder, residence time of the melt in the extruder and the design of the extruder (single screw, twin screw, number of flights per unit length, channel depth, flight clearance, mixing zone etc.) are several variables which control the amount of shear to be applied.

After the aforementioned and sufficient processing, optionally including subjecting the flowable mixture of intercalated layered material and said polymer melt to shear mixing, the material can be made to exhibit an X-ray diffraction pattern characteristic of the exfoliated state defined above. As formed by this process, the platelet particles dispersed in matrix polymers, on average, have the thickness of the individual layers, or small multiples less than about 10, preferably less than about 5 and more preferably less than about 3 of the layers, and still more preferably 1 or 2 layers, as determined by transmission electron (TEM) microscopy. In the preferred embodiments of this invention, at least intercalation of every interlayer space is complete so that all or substantially all individual layers delaminate one from the other to form separate platelet particles. In cases where intercalation is incomplete between some layers, those layers may not delaminate in the polymer melt, and will form platelet particles comprising those layers in a coplanar aggregate. These latter platelet particles can still constitute nanoscale and nanodispersed fillers and provide enhanced properties over and above those provided by conventional microscale fillers, as long as they are less than about 10 layers thick and preferably less than 5 layers thick.

The process of this invention is preferably carried out in the absence of air, as for example in the presence of an inert gas, such as, argon, neon, nitrogen or the like. The process can be carried out in a batchwise or discontinuous fashion, as for example, carrying out the process in a sealed container. Alternatively, the process can be carried out in a continuous fashion in a single processing zone, as for example by use of an extruder, from which air is largely excluded, or in a plurality of such reaction zones in series or parallel.

The final mixture may include various optional components which are additives commonly employed with polymers. Such optional components may be added to the polymer melt or later and include nucleating agents, fillers, antioxidants, preservatives, plasticizers, impact modifiers, chain extenders, plasticizers, colorants, mold release lubricants, antistatic agents, pigments, fire retardants, and the like. These optional components and appropriate amounts are well known to those of skill in the art.

The nanocomposites of this invention exhibit useful properties. The nanocomposite compositions according to the invention are thermoplastic materials from which molded articles of manufacture having valuable properties can be produced by conventional shaping processes, such as melt spinning, casting, vacuum molding, sheet molding, injection molding and extruding. Examples of such molded articles are components for technical equipment, apparatus castings, household equipment, sports equipment, bottles, containers, components for the electrical and electronics industries, car components, circuits, fibers, foamed articles such as cups, sheets, building insulation, etc., semi-finished products which can be shaped by machining and the like. The use of the materials for coating articles by means of powder coating processes is also possible, as is their use as hot-melt adhesives. The molding compositions according to the invention are outstandingly suitable for specific applications of all types since their spectrum of properties can be modified in the desired direction in manifold ways.

The molding compositions according to the invention are outstandingly suitable for the production of sheets and panels having valuable properties. Such sheets and panels may be shaped by conventional processes such as vacuum processing or by hot pressing to form useful objects. The sheets and panels according to the invention are also suitable for coextruding with other materials or as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

The compositions of this invention are useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness. In the film, the major plane of the platelet fillers is substantially parallel to the major plane of the film. The extent of parallelism of particles and film can be determined by X-ray diffraction analysis.

The following specific examples are presented to more particularly illustrate the invention and are not to be construed as limitations thereon.

EXAMPLES

Materials

Acetonitrile was stirred with phosphorous pentoxide overnight and distilled prior to use. Methyl methacrylate was dried with calcium hydride and distilled at reduce pressure before use. Triethylamine hydrochloride was recrystallized from acetone/diethyl ether and dried in vacuo at 65° C. for 2 d over phosphorous pentoxide. Styrene was passed through a short column of alumina (neutral) prior to polymerization. All other reagents were used as received. Organically modified clays, Cloisite® 15A montomorillonite clay (abbreviation: C15A) and Cloisite® 10A montomorillonite clay (abbreviation: C10A), were used as received from Southern Clay Products (Gonzales, Tex., USA). C15A and C10A contain dimethyl dihydrogenated tallow and dimethybenzyl hydrogenated tallow ammonium cations, respectively, as organic modifiers. Commercial linear polystyrene (abbreviation: PS270) was provided by Aldrich Chemical Company. A blend of linear polystyrene and poly(phenylene oxide) (Noryl® PX0888) was supplied by General Electric Company. DOWEX MSC macroporous ion-exchange resin was obtained from the Dow Chemical Company.

Characterization

The $^1$H NMR spectra were acquired on a Varian® Mercury-Vx automated NMR spectrometer operating at 300 MHz. Samples were dissolved in deuterated chloroform ($CDCl_3$) or deuterated dichloromethane ($CD_2Cl_2$). All spectra were referenced to internal tetramethylsilane.

Size exclusion chromatography (SEC) was performed using tetrahydrofuran solvent. Details of multi-detector SEC have been described previously by T. H. Mourey and S. T. Balke (*J. Appl. Polym. Sci.* 1998, 831). Ultraviolet (UV), 15 and 90 degree light-scattering (LS), differential viscometry (DV), and differential refractive index (DRI) detectors were connected in series after three Plgel mixed-C columns (Polymer Labs, Amherst, Mass.). Most star polymers have low solution viscosities, and are prepared at a concentration of 2.5 mg/mL and injected as 100 µL.

Electrospray ionization (ESI) mass spectra were obtained on a Micromass Platform II instrument in positive and negative modes. The mass to charge (m/e) ratio(s) of the ions were determined utilizing a quadropole mass spectrometer which was scanned from 65 to 2000 amu. The polarity of the ions detected was rapidly switched between positive and negative, and the data were recorded. Field desorption (FD) mass spectrometry was performed with a Varian MAT model 731 instrument.

Preparative liquid chromatography was performed on a Hewlett Packard® 1090 HPLC instrument equipped with a Keystone® Hypersil BDS-C18 8µ (20 mm×250 mm) and a Waters® PDA detector at 254 nm. The mobile phase flow was at a rate of 20 mL/min with a gradient for which solvent A was water, solvent C was acetonitrile, and solvent D was 2-propanol. Time program: 0–70 min, A:C:D= 20:40:40–0:50:50

X-ray diffraction data were collected on a Rigaku® D2000 diffractometer equipped with a Cu rotating anode, diffracted beam monochrometer, and scintillation detector. The operating voltage was 50 kv and the current was 300 mA. Samples for X-ray diffraction analysis were generated by placing an aliquot of each blend on a glass microscope slide. Each sample was annealed in vacuum for specified time and temperature followed by quenching in air and X-ray diffraction data were collected at ambient temperature in 27% relative humidity.

Example 1

This example illustrates the preparation of a pentafunctional initiator with the following structure:

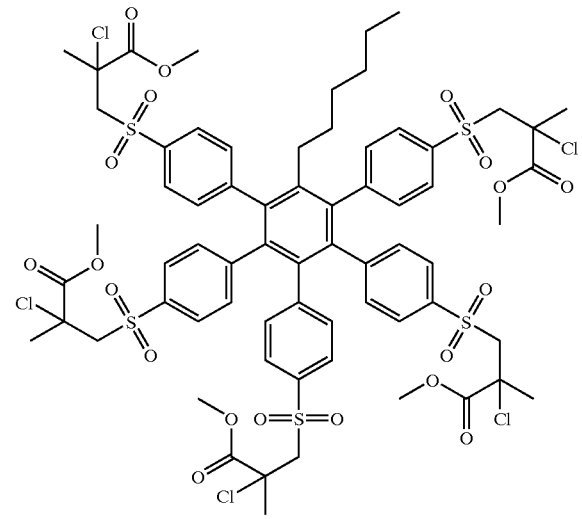

Initiator I

This compound was used for forming the macromolecular core for a five-arm star polymer for use in a composition according to the present invention, by the following steps.

Synthesis of I-phenyl-1-octyne

A mixture of 95.0 g (0.466 mol) of iodobenzene, 100 mL of piperidine, and 400 mL of acetonitrile was deaerated by sparging with nitrogen for 30 min. Bis(triphenylphosphine) palladium (II) chloride (3.27 g, 0.0047 mol) and copper (I) iodide (0.44 g, 0.0023 mol) were added, and the mixture was stirred mechanically while continuing sparging for 15 min. The compound 1-octyne (56.4 g, 0.512 mol) was deaerated separately in the same way, and then added to the stirred reaction mixture under nitrogen at room temperature. The resulting mixture was stirred mechanically and warmed at 65° C. for 24 h, during which time it turned from yellow to brown. The mixture was cooled to room temperature, and treated with 200 mL of 10% aqueous hydrochloric acid and 300 mL of Ligroin. The organic layer was separated, and the aqueous layer was further extracted three times with 300 mL each of Ligroin. The combined extracts were dried over anhydrous magnesium sulfate, filtered, passed through a short column of silica, and then concentrated to deposit a light brown oil. The product was purified by distillation at reduced pressure to afford 68.9 g (79%) of a gold oil, bp 68–102° C./0.05 mm. $^1$H NMR ($CDCl_3$) δ 0.90 (t, 3 H), 1.3 (m, 4 H), 1.5 (m, 2 H), 1.6 (m, 2 H), 7.25 (m, 3 H), 7.40 (m, 2 H).

Synthesis of 1-hexyl-2,3,4,5,6-pentaphenylbenzene

A 100 mL round bottom flask was charged with 2.5 g (0.013 mol) of 1-phenyl-1-octyne 6.0 g (0.16 mol) of tetraphenylcyclopentadienone, and 2.0 g of benzophenone. The system was degassed and then filled with nitrogen. The mixture was heated for 2.5 h at 250° C. The purple reaction mixture was cooled to room temperature, and then dissolved in toluene. The product was precipitated in excess methanol, filtered, and dried to provide 5.47 g (75%) of a white solid. $^1$H NMR (CDCl$_3$) δ 0.65 (t, 3H), 0.8 (m, 4 H), 0.97 (q, 2 H), 1.23 (q, 2 H), 2.31 (m, 2 H). MS (FD) m/e 512 (M$^+$).

Synthesis of 1-hexyl-2,3,4,5,6-penta(4-chlorosulfonylphenyl)benzene

A 250 mL round bottom flask was charged with 2.0 g (0.004 mol) of 1-hexyl-2,3,4,5,6-pentaphenylbenzene and 50 mL of dichloromethane. Chlorosulfonic acid (15 mL) was added to the stirred reaction mixture at room temperature via an addition funnel. The reaction mixture turned immediately purple, and then clear orange after 1 h. The reaction mixture was stirred at room temperature for 1 d, and then poured onto crushed ice. The layers were separated, and the aqueous layer was extracted twice with dichloromethane. The combined organic extracts were dried over anhydrous magnesium sulfate, filtered, and concentrated to deposit a light-gray solid. The product was recrystallized from ethyl acetate to provide 1.39 g (57%) of a white powder. $^1$H NMR (CDCl$_3$) δ 7.96 (d, J=10, 4 H), 7.66 (m, 6), 7.41 (d, J=10, 4H), 7.08 (m, 6H). MS (FD) m/e 1034 (M$^+$).

Synthesis of Pentafunctional Initiator

To a 250 mL flask were added 1-hexyl-2,3,4,5,6-penta(4-chlorosulfonylphenyl)benzene (10.0 g, 9.44 mmol), copper (I) chloride (70 mg, 0.71 mmol), triethylamine hydrochloride (200 mg, 1.5 mmol), methyl methacrylate (6.1 g, 61 mmol), and acetonitrile (20 mL) and the reaction mixture was evacuated and backfilled with nitrogen five times. The reaction mixture was stirred at 80° C. for 18 h. The reaction mixture was cooled to room temperature, passed through a short column of silica gel, and concentrated to give a yellow solid. This solid was re-dissolved in acetone and precipitated into Ligroin to afford an off-white solid. Yield: 14.4 g (99%). mp 114–118° C. $^1$H NMR (CDCl$_3$) δ 0.69 (t, J=6.9 Hz, 3H), 0.76 (m, 4H), 0.96 (m, 2H), 1.14 (m, 2H), 1.78–1.92 (m, 15H), 2.19 (m, 2H), 3.56–4.02 (m, 10H), 3.79–3.86 (m, 15H), 6.94–7.01 (m, 10H), 7.42–7.53 (m, 10H). MS (ESI): m/e 1534 [M+H]$^+$.

Example 2

Next, the decafunctional initiator with the following structure, for forming the macromolecular core of a ten-arm star polymer, was prepared for use in a composition according to the present invention:

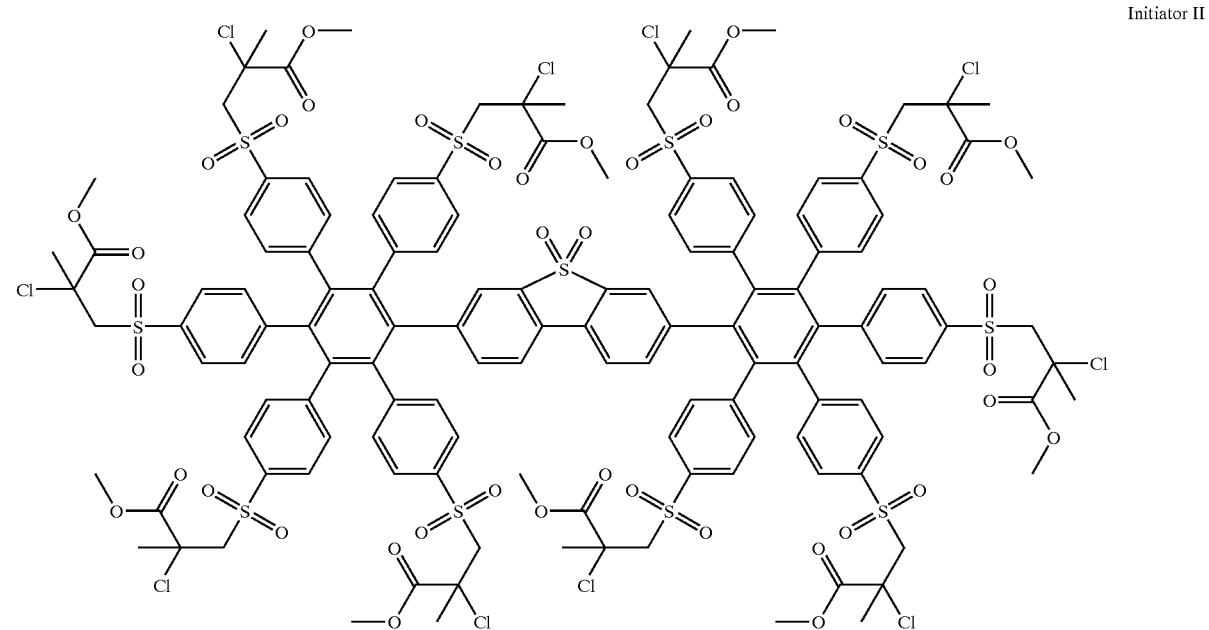

Initiator II

The following steps comprised the preparation of this initiator:

Synthesis of 4,4'-bis(phenylethynyl)biphenyl

A mixture of 12.0 g (0.030 mol) of 4,4'-diiodobiphenyl, 150 mL of piperidine, and 200 mL of acetonitrile was deaerated by sparging with argon, and then 0.40 g (0.6 mmol) of bis(triphenylphosphine) palladium dichloride and 0.25 g (1.3 mmol) of copper (I) iodide were added. To the resulting stirred solution at room temperature was added 6.04 g (0.059 mol) of phenylacetylene via a syringe. The reaction mixture was held at room temperature for 30 min, and then heated at 60° C. for 3 h. The precipitated product was collected by filtration of the cooled reaction mixture, and was washed successively with acetonitrile and dichloromethane until the solid was colorless. Yield: 8.5 g (81%).

Synthesis of 2',2"",3',3"",5',5"",6',6""-octaphenyl-p-sexiphenyl

A mixture of 5.00 g (0.0 14 mol) of 4,4'-bis(phenylethynyl)biphenyl, 10.85 g (0.028 mol) of tetraphenylcyclopentadienone, and 10 g of benzophenone was heated under argon at 280° C. for 3 h. The reaction mixture was cooled to room temperature, slurried in 500 mL of dichloromethane, and filtered. The collected product was washed successively with dichloromethane and acetone until the filtrate was colorless. The product was purified by extraction with boiling benzonitrile for 30 min, followed by cooling to room temperature and filtration. Yield: 14.0 g (93%).

Synthesis of 3,3'-bis(2,3,4,5,6-penta(4-chlorosulfonylphenyl)phenyl) dibenzothiophene-1,1-dioxide A suspension of 2.0 g (1.9 mmol) of 2',2"",3',3"",5',"", 6',6""-octaphenyl-p-sexiphenyl, 5 mL of chlorosulfonic acid, and 20 mL of dichloromethane was stirred at room temperature for 3 d. the reaction mixture was diluted with 20 mL of nitromethane and the precipitated product was filtered. The product was washed successively with nitromethane and acetonitrile. Yield: 2.5 g (65%).

Synthesis of Decafunctional Initiator

To a 100 mL flask were added decafunctional sulfonylchloride (1.72 g, 0.81 mmol), copper (I) chloride (24 mg, 0.24 mmol), triethylamine hydrochloride (72 mg, 0.52 mmol), methyl methacrylate (2.12 g, 21.2 mmol), and acetonitrile (30 mL) and the reaction mixture was degassed and backfilled with nitrogen five times. The flask was heated at 80° C. for 3 d. At the completion of the reaction, the insoluble solid was filtered off and the filtrate was concentrated to give a yellow viscous liquid. This liquid was diluted with dichloromethane and washed with water. The organic layer was dried over anhydrous magnesium sulfate and concentrated to give a yellow solid, which was re-dissolved in a small amount of dichloromethane and precipitated into Ligroin to afford a yellow solid. Mass spectroscopic analysis of this solid revealed that the reaction was incomplete, showing the presence of some sulfonic acid units. The isolated product was rechlorinated with oxalyl chloride with a catalytic amount of N,N-dimethylformamide (DMF) in dichloromethane. These processes were repeated twice and the final product was purified with preparative liquid chromatography to afford a white solid, 0.33 g, 13% yield. mp 165–182° C.; $^1$H NMR (CD$_2$Cl$_2$) δ 1.64–1.90 (m, 2H), 1.78 (s, 3H), 3.67–4.05 (m, 3H), 6.94–7.62 (m). MS (ESI): m/e 3136 [M+Na]$^+$.

Comparative Example 3

This Example illustrates the synthesis of a monofunctional initiator with the following structure:

Initiator III

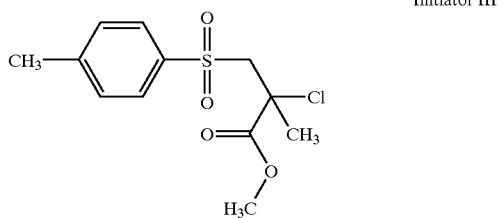

This compound is used in the preparation of a linear polystyrene for comparison with polystyrene star polymers. The preparation was as follows.

Synthesis of the Monofunctional Initiator

To a 250 mL flask were added p-toluenesulfonyl chloride (10.0 g, 52.5 mmol), copper (I) chloride (78 mg, 0.79 mmol), triethylamine hydrochloride (230 mg, 1.7 mmol), methyl methacrylate (6.8 g, 68 mmol), and acetonitrile (5 mL), and the reaction mixture was evacuated and backfilled with nitrogen five times. The reaction mixture was stirred at 80° C. for 18 h. The reaction mixture was cooled to room temperature, passed through a short column of silica gel, and concentrated to give a viscous yellow liquid, which was crystallized from methanol to give a white solid, 5.2 g, 34% yield. mp 89–90° C. $^1$H NMR (CDCl$_3$) δ 2.02 (s, 3H), 2.45 (s, 3H), 3.73(d, J=14 Hz, 1H), 3.82 (s, 3H), 4.14 (d, J=14 Hz, 1H), 7.36 (dd, J=0.6 and 8.4 Hz, 2H), 7.78 (dd, J=0.6 and 8.4 Hz, 2H). MS (ESI): m/e 291 [M+H]$^+$.

Example 4

This example illustrates a general polymerization procedure for linear or star polymers.

Synthesis of Linear or Star Polymer

A flask was charged with the appropriate initiator (1 equiv), copper (I) chloride (1 eq), 2,2'-bipyridine (2 eq), and monomer (150–9000 eq). Diphenyl ether in an amount by weight approximately equal to the monomer was optionally added. The reaction mixture was evacuated and backfilled with nitrogen five times. The reaction mixture was stirred for 18–72 h in the temperature range of 80–120° C. The brown reaction mixture was diluted with tetrahydrofuran (THF) and passed through a short column of silica gel. The eluent was treated with DOWEX MSC macroporous ion-exchange resin for 15 min and filtered. The solvent was evaporated at reduced pressure to give a viscous liquid, which was poured into excess methanol to precipitate the polymer as a white solid. The product was collected and dried in a vacuum oven. The polymer was characterized by $^1$H NMR and by size exclusion chromatography (SEC).

Dehalogenation of Linear or Star Polymer

A flask was charged with the linear or star polymer (1 eq), tributyltin hydride (3 eq), 2,2'-azobisisobutyronitrile (AIBN, 0.1 eq), and toluene solvent. The reaction mixture was evacuated and backfilled with nitrogen five times. The reaction mixture was stirred for 4 h at 80° C. The polymer was precipitated into excess methanol, collected, and dried briefly. The polymer was dissolved in dichloromethane and reprecipitated into excess methanol. The product was collected and dried in a vacuum oven to afford a white solid. Typical recovery of polymer was 94–96%.

Example 5

This Example illustrates the preparation of a five-arm star polystyrene.

The procedure of Example 4 was followed using the pentafunctional initiator (0.02 g, 0.013 mmol) prepared in Example 1, specifically using copper (I) chloride (0.0064 g. 0.064 mmol), 4,4'-dinonyl-2–2'-bipyridine (0.053 g, 0.013 mmol), and styrene (4.07 g, 39.1 mol). The reaction was conducted at 90° C. for 24 h. The product was obtained as a white solid, 0.63 g (15% yield). Characterization of the polymer by SEC gave $\overline{M}_n$=54,400 and $\overline{M}_w$=78,400 g/mol.

Example 6

This Example illustrates the preparation of another five-arm star polystyrene with a low molar mass.

The procedure of Example 4 was followed using the pentafunctional initiator (4.00 g, 1.30 mmol) prepared in Example 1, specifically using copper (I) chloride (1.29 g. 13.0 mmol), 2–2'-bipyridine (4.07 g, 26.0 mmol), and styrene (407 g, 3.91 mol). The reaction was conducted at 80° C. for 48 h. The product was obtained as a white solid, 59 g (14% yield). Characterization of the polymer by SEC gave $\overline{M}_n$=37,100 and $\overline{M}_w$=46,400 g/mol.

Example 7

This Example illustrates the preparation of another five-arm star polystyrene with a medium molar mass.

The procedure of Example 4 was followed using the pentafunctional initiator (2.00 g, 1.30 mmol) prepared in Example 1, specifically using copper (I) chloride (0.64 g. 6.5 mmol), 2–2'-bipyridine (2.03 g, 13.0 mmol), and styrene (407 g, 3.91 mol). The reaction was conducted at 80° C. for 72 h. The product was obtained as a white solid, 174 g (42% yield). Characterization of the polymer by SEC gave $\overline{M}_n$=71,900 and $\overline{M}_w$=138,000 g/mol.

Example 8

This Example illustrates the preparation of another five-arm star polystyrene with a large molar mass.

The procedure of Example 4 was followed using the pentafunctional initiator (4.00 g, 2.60 mmol) prepared in Example 1, specifically using copper (I) chloride (1.29 g. 13.0 mmol), 2–2'-bipyridine (4.07 g, 26.0 mmol), and styrene (407 g, 3.91 mol). The reaction was conducted at 80° C. for 66 h. The product was obtained as a white solid, 174 g (42% yield). Characterization of the polymer by SEC gave $\overline{M}_n$=104,000 and $\overline{M}_w$=208,000 g/mol.

Example 9

This Example illustrates the preparation of a ten-arm star polystyrene.

The procedure of Example 4 was followed using the decafunctional initiator (0.010 g, 3.2×10$^{-3}$ mmol) prepared in Example 2, specifically used copper (I) chloride (0.0032 g. 0.032 mmol), 4,4'-dinonyl-2–2'-bipyridine (0.026 g, 0.062 mmol), and styrene (3.01 g, 28.9 mol). The reaction was conducted at 95° C. for 24 h and then at 100° C. for 1 h. The product was obtained as a white solid, 0.44 g (15% yield). Characterization of the polymer by SEC gave $\overline{M}_n$=46,800 and $\overline{M}_w$=162,000 g/mol.

Comparative Example 10

This Example illustrates the preparation of a linear polystyrene for comparison purposes.

The procedure of Example 4 was followed using the monofunctional initiator (0.020 g, 0.068 mmol) prepared in Comparative Example 3, specifically using copper (I) chloride (0.0068 g. 0.068 mmol), 2–2'-bipyridine (0.022 g, 0.13 mmol), and styrene (4.3 g, 41 mol). Diphenyl ether (4.7 mL) was added as solvent. The reaction was conducted at 120° C. for 24 h. The product was obtained as a white solid, 2.7 g (63% yield). Characterization of the polymer by SEC gave $\overline{M}_n$=38,300 and $\overline{M}_w$=57,600 g/mol.

Comparative Example 11

This Example illustrates the preparation of linear poly(methyl methacrylate) for comparison purposes.

The procedure of Example 4 was followed using the monofunctional initiator (0.020 g, 0.068 mmol) prepared in Comparative Example 3, specifically using copper (I) chloride (0.0068 g. 0.068 mmol), 2–2'-bipyridine (0.022 g, 0.13 mmol), and methyl methacrylate (4.13 g, 41 mol). Diphenyl ether (4.4 mL) was added as solvent. The reaction was conducted at 120° C. for 24 h. The product was obtained as a white solid, 2.7 g (63% yield). Characterization of the polymer by SEC gave $\overline{M}_n$=56,000 and $\overline{M}_w$=61,200 g/mol.

Comparative Example 12

This Example illustrates the preparation of five-arm star poly(methyl methacrylate) for comparison purposes.

The procedure of Example 4 was followed using the pentafunctional initiator (0.025 g, 0.016 mmol) prepared in Example 1, specifically using copper (I) chloride (0.0081 g. 0.081 mmol), 2–2'-bipyridine (0.025 g, 0.16 mmol), and methyl methacrylate (2.44 g, 24 mol). Diphenyl ether (2.6 mL) was added as solvent. The reaction was conducted at 90° C. for 1 h. The product was obtained as a white solid, 0.68 g (28% yield). Characterization of the polymer by SEC gave $\overline{M}_n$=65,900 and $\overline{M}_w$=80,800 g/mol.

Comparative Example 13

This Example illustrates the preparation of ten-arm star poly(methyl methacrylate) for comparison purposes.

The procedure of Example 4 was followed using the decafunctional initiator (0.015 g, 0.0048 mmol) prepared in Example 2, specifically using copper (I) chloride (0.0048 g. 0.048 mmol), 2–2'-bipyridine (0.015 g, 0.96 mmol), and methyl methacrylate (6.51 g, 65 mol). The reaction was conducted at 80° C. for 1 h. The product was obtained as a white solid, 0.21 g (3% yield). Characterization of the polymer by SEC gave $\overline{M}_n$=51,800 and $\overline{M}_w$=59,200 g/mol.

Example 14

This Example illustrates polymer-clay nanocomposites made using samples of the polystyrene with five arms (Example 5) or ten arms (Example 9) compared to linear polystyrene (Comparative Example 10).

Melt Compounding and X-Ray Analysis

Simple mixtures of polystyrene and Cloisite® 15A clay (C15A) powders were held unstirred at 185° C. for various periods of time. Small portions of the mixtures were smeared on a glass substrate, and analyzed by X-ray diffraction. All composites contained 20 wt % of C15A. The morphologies of the blends were determined by examining the position, broadness, and intensity of the (001) basal plane diffraction peak of the silicate layers of clay as a function of annealing time.

FIG. 1 (comparison) shows X-ray diffraction patterns of a linear polystyrene clay mixture annealed for various periods of time at 185° C. The (001) basal plane diffraction peaks, compared to the original clay, changed slightly on initial compounding to produce a pattern consistent with intercalation. Continued heating produced insignificant changes.

Figure 2:
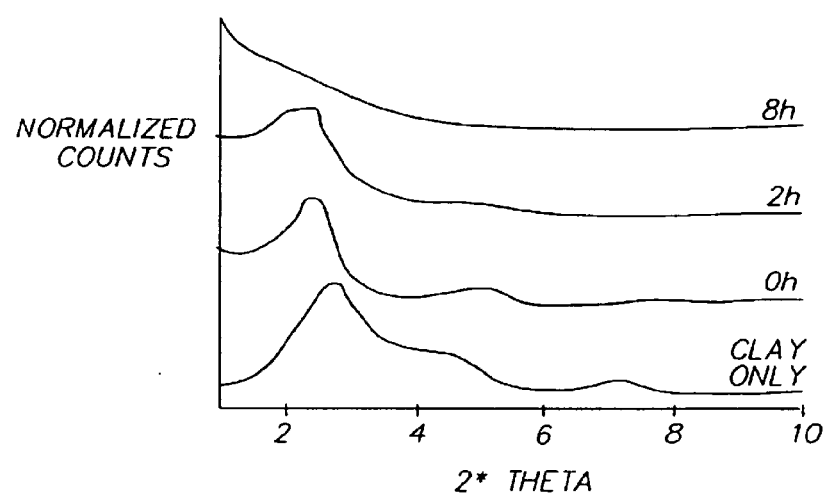
FIG. 2 shows X-ray diffraction patterns of a five-arm polystyrene clay mixture of Example 14 below annealed for various periods of time at 185° C.
Figure 3:
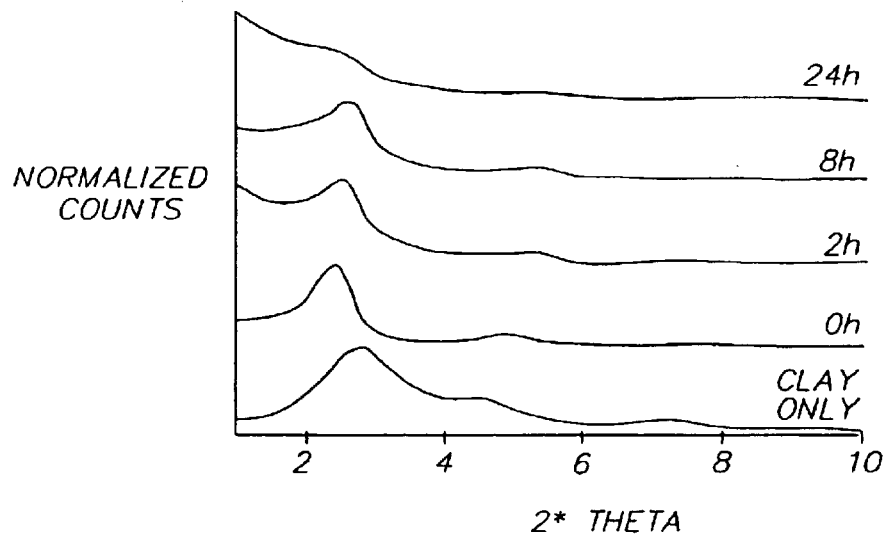
FIG. 3 shows X-ray diffraction patterns of a ten-arm polystyrene clay mixture of Example 14 below annealed for various periods of time at 185° C.

With five-arm star polystyrene, the situation was completely different (FIG. 2). Again, the original clay diffraction pattern changed immediately to one consistent with intercalation. Remarkably, on continued heating the peaks broadened and eventually disappeared after a few hours. Eventually, a featureless diffuse diffraction pattern was obtained, indicating an exfoliated structure. FIG. 2 shows the X-ray diffraction patterns of the five-arm polystyrene clay mixture annealed for various periods of time at 185° C. Ten-arm star polystyrene behaved similarly to five-arm star polystyrene, except the exfoliation occurred more slowly. This difference may be due to the higher molar mass of this sample, or the overall difference in structure. FIG. 3 shows the X-ray diffraction patterns of the ten-arm polystyrene clay mixture annealed for various periods of time at 185° C.

Figure 4A:
FIG. 4A shows the transmission electron microscope (TEM) image of the intercalated structure of the nanocomposite made with linear polystyrene wherein the polymer-clay mixture of Example 14 was annealed at 185° C. for 24 h.
Figure 4B:
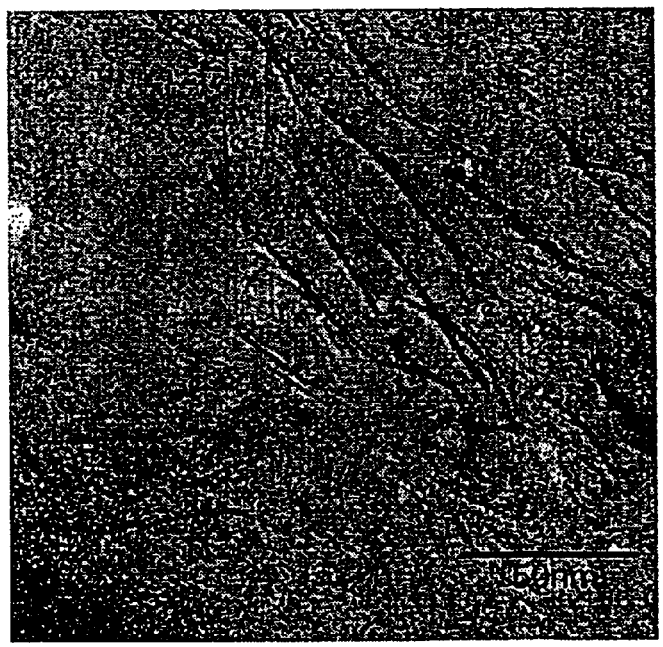
FIG. 4B shows the TEM image of the exfoliated structure of the nanocomposite with five-arm star polystyrene wherein the polymer-clay mixture of Example 14 was annealed at 185° C. for 8 h.

The exfoliated structures of the nanocomposites with star polystyrenes were confirmed by transmission electron microscopy (TEM). The widely separated, uncorrelated platelets were clearly visible, compared to the tightly associated, parallel structure of the intercalated linear polystyrene. FIGS. 4A and 4B, respectively, show TEM of linear and five-arm polystyrene clay mixtures after annealing, at 185° C. for 24 and 8 h, respectively. A section of an intercalated morphology is shown in FIG. 4A. A few intercalated tactoids are seen as regions of alternating dark and light narrow bands. In accordance with the X-ray diffraction measurements, the gallery height was expanded slightly to accommodate the polymer chains. In contrast, the microstructure exhibited in FIG. 4B is indicative of an exfoliated morphology wherein the individual silicate layers are thoroughly suspended in the polymer matrix, leading to a featureless X-ray diffraction pattern as previously discussed.

The above results demonstrate that substantially exfoliated polystyrene-clay nanocomposites can be produced with star polystyrene but not with linear polystyrene by simple compounding methods.

Comparative Example 15

This comparative experiment demonstrates that poly (methyl methacrylate), compared to polystyrene, cannot form a substantially exfoliated clay nanocomposite by simple compounding methods, even with a star structure.

Figure 5:
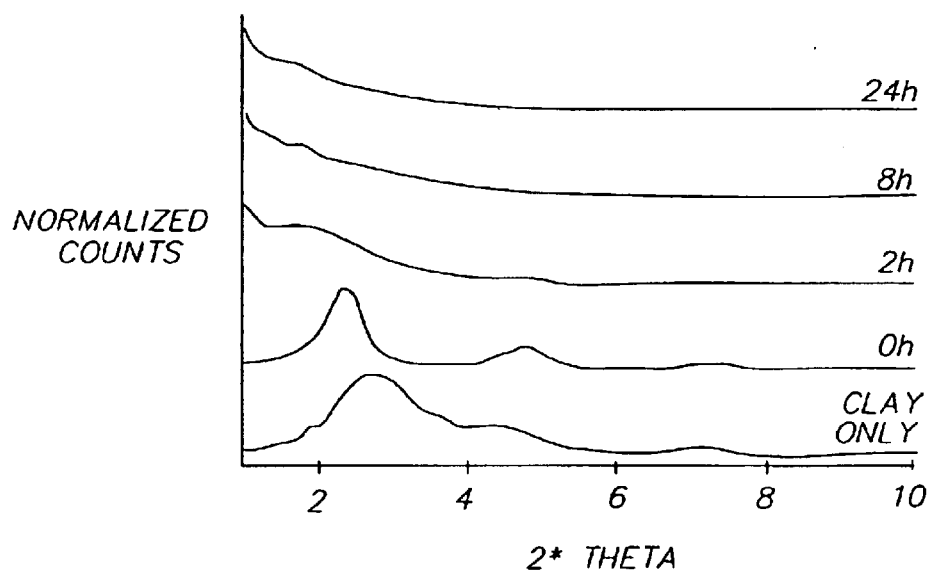
FIG. 5 shows the X-ray diffraction patterns of a mixture of a five-arm star poly(methyl methacrylate) and clay after 0 and 8 hrs of annealing at 225° C. in vacuum, as described in Comparative Example 15 below.

Linear, five-, and ten-arm poly(methyl methacrylate) (PMMA) samples were prepared as described in Comparative Examples 11–13, mixed with clay as for the polystyrene in Example 14, and heated for various periods of time at 225° C. The X-ray diffraction patterns of FIG. 5 showed evidence for intercalated morphologies and remain identical even after annealing at 225° C. In particular, the figure shows the X-ray diffraction patterns of the C15A and the five-arm PMMA-clay blend after 0 and 8 h of annealing, respectively, at 225° C. in vacuum. The samples made with C15A and linear poly(methyl methacrylate) and ten-arm star poly(methyl methacrylate) showed similar X-ray diffraction patterns. No indication of exfoliation was apparent in these samples containing either linear or star PMMA.

These observations indicate that the choice of star polymer can be significant in determining whether exfoliation will occur in a layered material/star polymer nanocomposite.

Example 16

This Example illustrates the effect of polymer size on the kinetics of clay exfoliation. Samples of five-arm star polystyrenes with different molar mass from Examples 6–8 (low, medium, and high, respectively) were mixed with clay as for the polystyrene in Example 14, and heated for various periods of time at 225° C.

Figure 6:
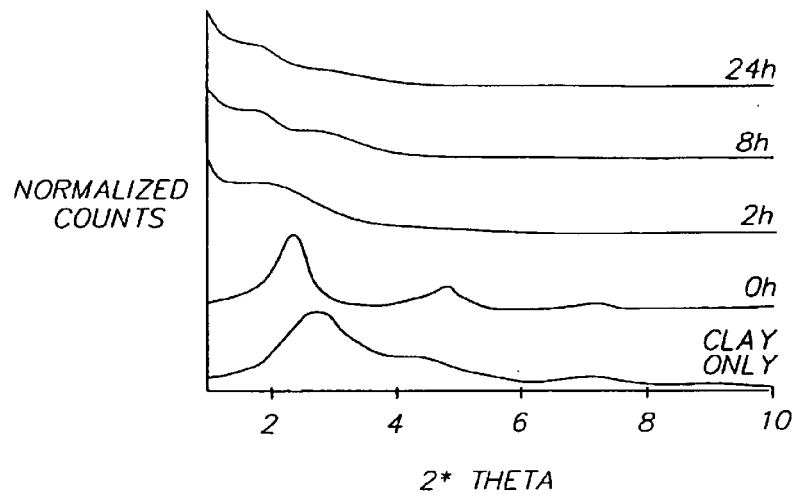
FIG. 6 shows the X-ray diffraction patterns of a mixture of clay and low molar mass five-arm star polystyrene after various periods of annealing at 225° C. in vacuum, as described in Example 16 below.
Figure 7:
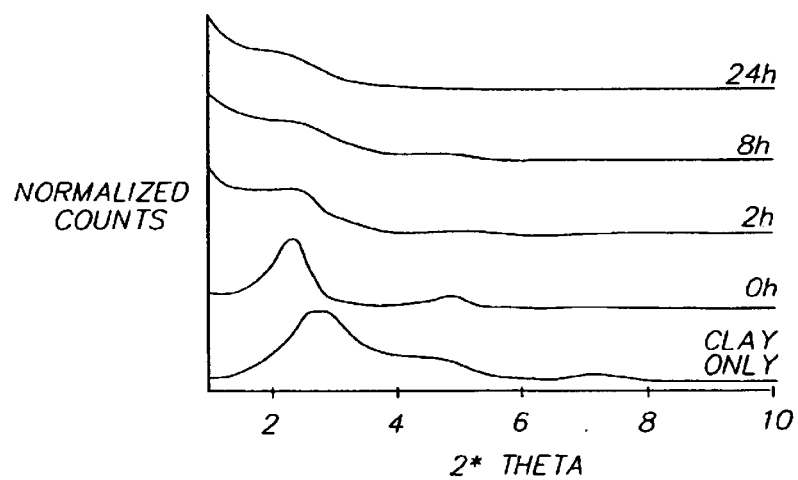
FIG. 7 shows the X-ray diffraction patterns of a mixture of clay and medium molar mass five-arm star polystyrene after various periods of annealing at 225° C. in vacuum, as described in Example 16 below.

FIG. 6 show the X-ray diffraction patterns of C15A alone and mixtures of the polystyrene of Example 6 with C15A after 0, 2, 8, 24 h of annealing at 225° C. in vacuum. Complete clay exfoliation occurred within 8 h of annealing as indicated by the featureless diffraction pattern in FIG. 6 (8 hours). On the other hand, for the larger star polystyrenes of Example 7 and 8, clay exfoliations progressed more slowly and only gradually approached their corresponding fully exfoliated morphologies. FIG. 7 displays progressive diffraction patterns of the five-arm star polystyrene of Example 7 blended with C15A as a function of annealing period at 225° C. in vacuum. The peak at 2θ~3.5° in FIG. 7 (24 h) remained detectable. Thus, the kinetics of clay exfoliation and the morphological outcome may depend on star polystyrene molecular weight to some extent. The higher molar mass polystyrenes from Example 7 and 8 apparently are slow to diffuse into the galleries of hosting silicate layers, resulting in only partially exfoliated morphologies at these conditions.

These observations demonstrate that the molar mass of the star polymer is an important consideration in obtaining fully exfoliated clay nanocomposites.

Example 17

This Example shows that the tailoring the organic modifiers of the clay can facilitate a better interaction with incoming polymer chains, to further promote the clay exfoliation achieved by the star polymers of the present invention.

Figure 8:
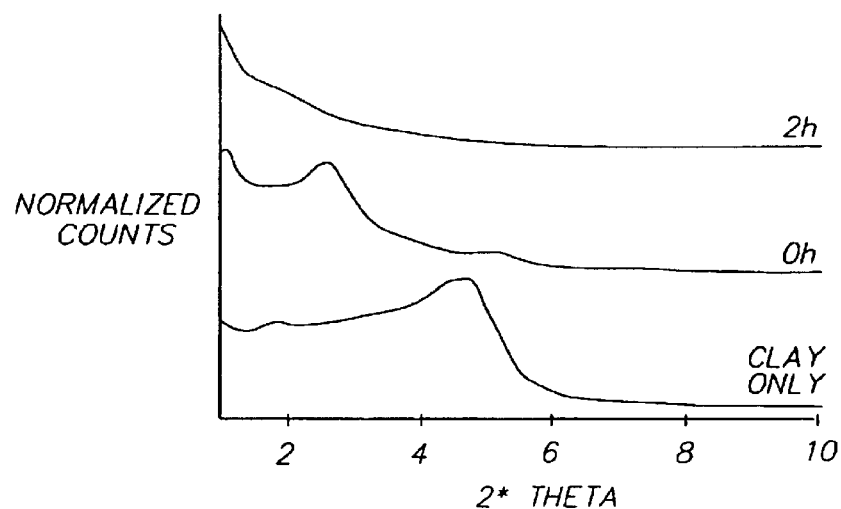
FIG. 8 shows the X-ray diffraction patterns of a mixture of clay and five-arm star polystyrene after various periods of annealing at 225° C. in vacuum, as described in Example 17 below.

The procedure of Example 16 was carried out, except that the organoclay was C10A instead of C15A. FIG. 8 shows the X-ray diffraction patterns of a C10A clay alone and a blend of five-arm polystyrene (Example 6) with C10A after 0 and 2 h of annealing at 225° C. in vacuum. As observed in previous Example 16, the diffraction pattern in FIG. 8 corresponding to 0 h exhibits a set of new peaks corresponding to a slightly larger interlayer spacing of an intercalated morphology. The diffraction pattern in FIG. 8 corresponding to 2 h reveals that a featureless diffraction pattern consistent with complete exfoliation of the silicate layers was obtained in just 2 h. More significantly, thorough exfoliations were also achieved in 2 h with the higher molar mass samples of five-arm polystyrene from Examples 7 and 8, which in Example 16 using C15A did not show fully exfoliated morphologies for the blends even after 24 h of annealing. Further annealing of the star polystyrene/C10A blends had little effect on their corresponding diffraction patterns, indicating that the thermodynamically stable states of the blends may have been attained in 2 h or less.

Example 18

This example shows the step-wise formation of a nanocomposite containing star polystyrene blended with commercial linear polystyrene.

The five-arm star polystyrene of Example 7 (3.20 g) was mixed with C10A clay (0.80 g) and heated at 225° C. for 2 h to form a preliminary exfoliated nanocomposite. The sample was then blended with linear polystyrene PS270 (6.00 g) and heated at 190° C. for 15 min with stirring. The X-ray diffraction results showed that the clay remained substantially exfoliated when a star polystyrene/clay nanocomposite was blended with linear polystyrene in a stepwise manner.

Example 19

This example shows the step-wise formation of a nanocomposite containing polystyrene and poly(phenylene oxide).

The five-arm star polystyrene of Example 7 (3.20 g) was mixed with C10A clay (0.80 g) and heated at 225° C. for 2 h to form a preliminary exfoliated nanocomposite. The sample was then blended with Noryl PX0888 (6.00 g) and heated at 250° C. for 5 min. The X-ray diffraction results showed that the clay remained substantially exfoliated when a star polystyrene/clay nanocomposite was blended with a polymer other than polystyrene.

Example 20

This Example illustrates the considerably greater thermal stability observed for an exfoliated nanocomposite, according to the present invention, containing only 2 wt % of the organoclay compared to the matrix polystyrene and the intercalated nanocomposite at the same clay loading. The five-arm star polystyrene in this Example was that of Example 7. The exfoliated clay nanocomposite containing linear and star polystyrene was that of Example 18.

Figure 9:
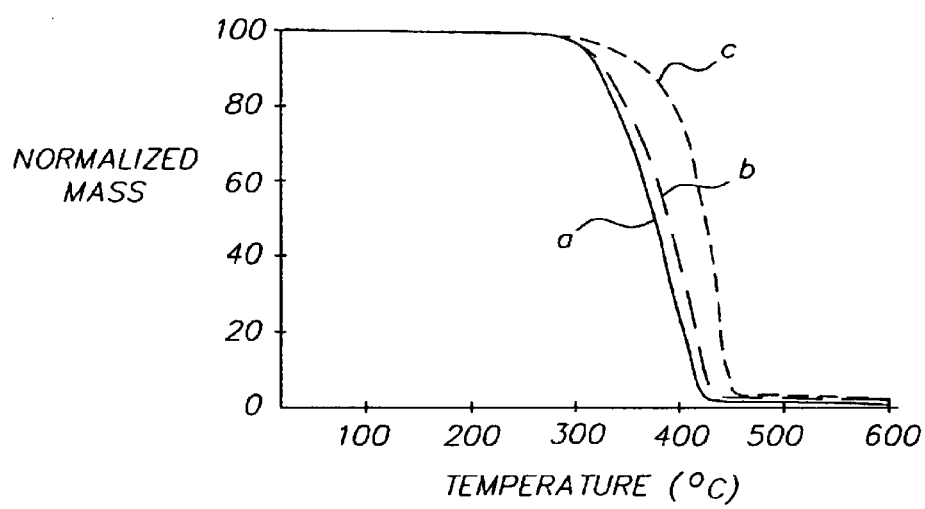
FIG. 9 (lines a–c) shows the thermogravimetric analysis (TGA) traces for a) a commercial linear polystyrene; b) an intercalated nanocomposite made from commercial linear polystyrene and clay (98/2 wt %); and c) an exfoliated nanocomposite comprising commercial linear polystyrene, five-arm star polystyrene, and clay (90/8/2 wt %), respectively, recorded in air, as described in Example 20 below.

Thermogravimetric analysis (TGA) was recorded on a TA Instruments model 2950. Samples were heated from ambient temperature to 600° C. at a rate of 10° C./min under air purge at a flow rate of 100 cc/min. FIG. 9 (lines a–c) present the TGA traces for the PS270 linear polystyrene, a PS270/C15A clay blend (98/2 wt %), and a PS270/five-arm star polystyrene/C15A clay blend (90/8/2 wt %), respectively. The curves demonstrate improved thermo-oxidative stability for the fully exfoliated nanocomposite (include star polystyrene) vs. linear polystyrene alone, or an intercalated blend of linear polystyrene and clay.

Example 21

This Example illustrates blending all components simultaneously rather than blending them in a step-wise fashion, using star polymers as "exfoliating agents" in preparation of nanocomposite materials. (It may be more convenient to blend all components simultaneously.) The five-arm star polystyrene in this Example was that of Example 7.

Figure 10A:
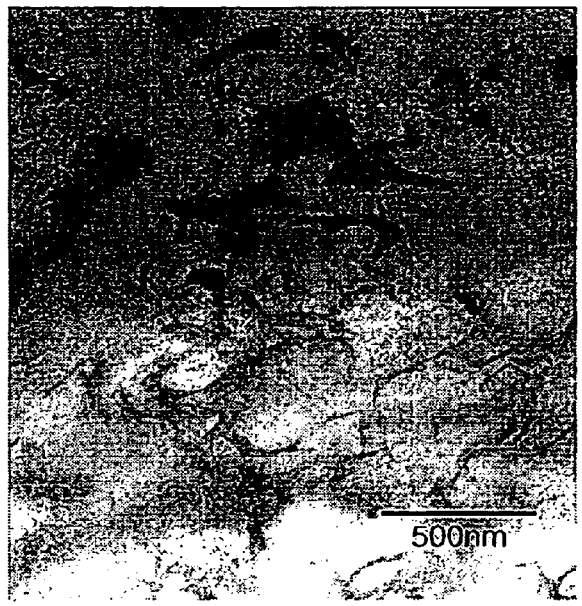
FIGS. 10(*a* and *b*) shows TEM micrographs (a) 500 nm and b) 50 nm magnifications), respectively, of an annealed blend containing the three ingredients as in FIG. 9 (line c), prepared by a simultaneous blend method, as described in Example 21 below.
Figure 10B:
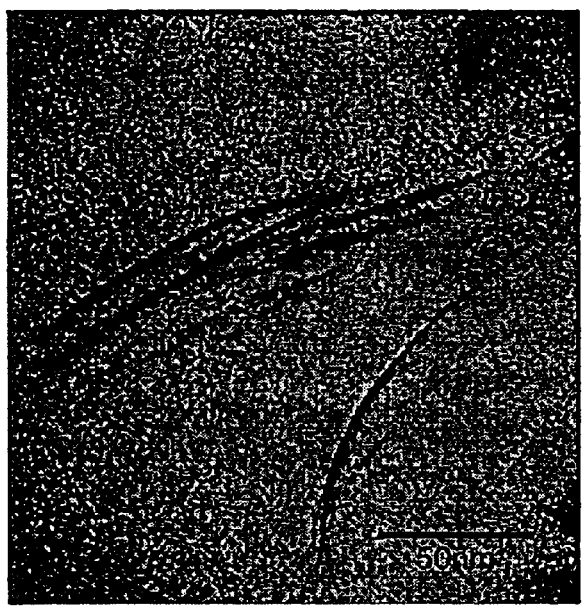

FIGS. 10 (a and b) shows TEM micrographs (500 nm and 50 nm magnifications) of an annealed (225° C.) blend containing the three ingredients, linear PS270, five-arm star polystyrene, and C15A clay blend (90/8/2 wt %). The micrographs exhibit silicate layers that are beginning to separate from one another locally en route to an overall exfoliated morphology. This process may be accelerated under shear generated by common manufacturing processes such as compounding and extruding.

The invention has been described in detail with particular reference to certain preferred embodiments thereof, but it will be understood that variations and modifications can be effected within the spirit and scope of the invention.

What is claimed is:

1. A method of substantially exfoliating a multilayered inorganic material in a polymer matrix comprising a star polystyrene, which method comprises (a) mixing the multilayered inorganic material with a polymeric composition comprising a star polymer in which a plurality of styrene-containing arms are connected to a core;

(b) heating the mixture to form a flowable polymer melt;

(c) optionally subjecting the mixture to shear;

(d) cooling the mixture, before or after any optional further processing steps, to obtain a substantially exfoliated material.

2. The method of claim 1, wherein linear polystyrene is mixed with the inorganic material and star polymer at any time prior to cooling the mixture.

3. The method of claim 1, wherein a product made therefrom is again heated and mixed with linear polystyrene while maintaining the exfoliation of the inorganic material.

4. The method of claim 2 wherein another polymer material is blended with the linear polystyrene the same time said linear polystyrene is mixed with the star polymer and inorganic material or at a different time.

5. The method of claim 4 where said polymer material is poly(phenyleneoxide) or a mixture of poly(phenyleneoxide) and polystyrene.

6. The method of claim 1, further comprising heating the mixture under high-shear mixing.

7. The method of claim 1, wherein the inorganic material comprises a phyllosilicate.

8. The method of claim 7, wherein the phyllosilicate is a smectite clay.

9. The method of claim 8, wherein the smectite clay is sodium montmorillonite.

10. The method of claim 1, wherein the inorganic material is in the form of a powder when mixed.

* * * * *